April 3, 1962   H. J. BUTLER   3,027,982
BRAKING SYSTEM FOR ROLLING STOCK
Filed Dec. 26, 1957   3 Sheets-Sheet 2
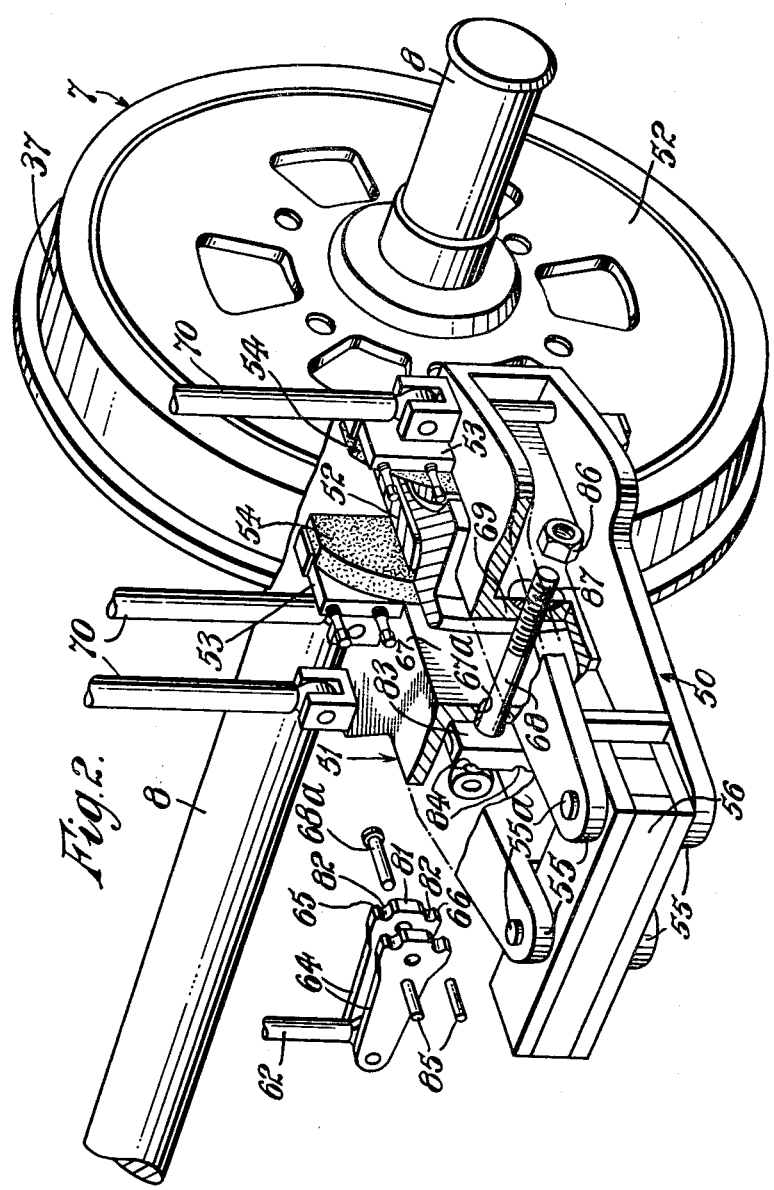
INVENTOR
Henry James Butler
by Benj. T. Rauber
his attorney

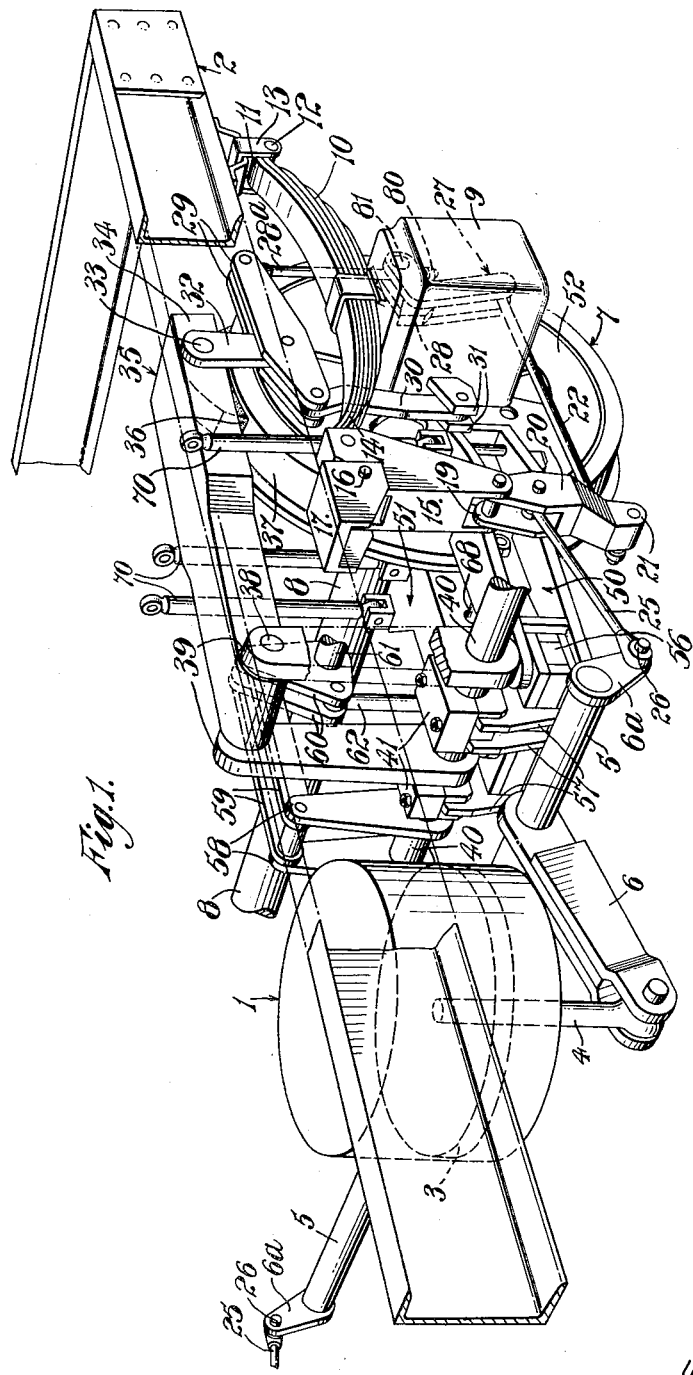

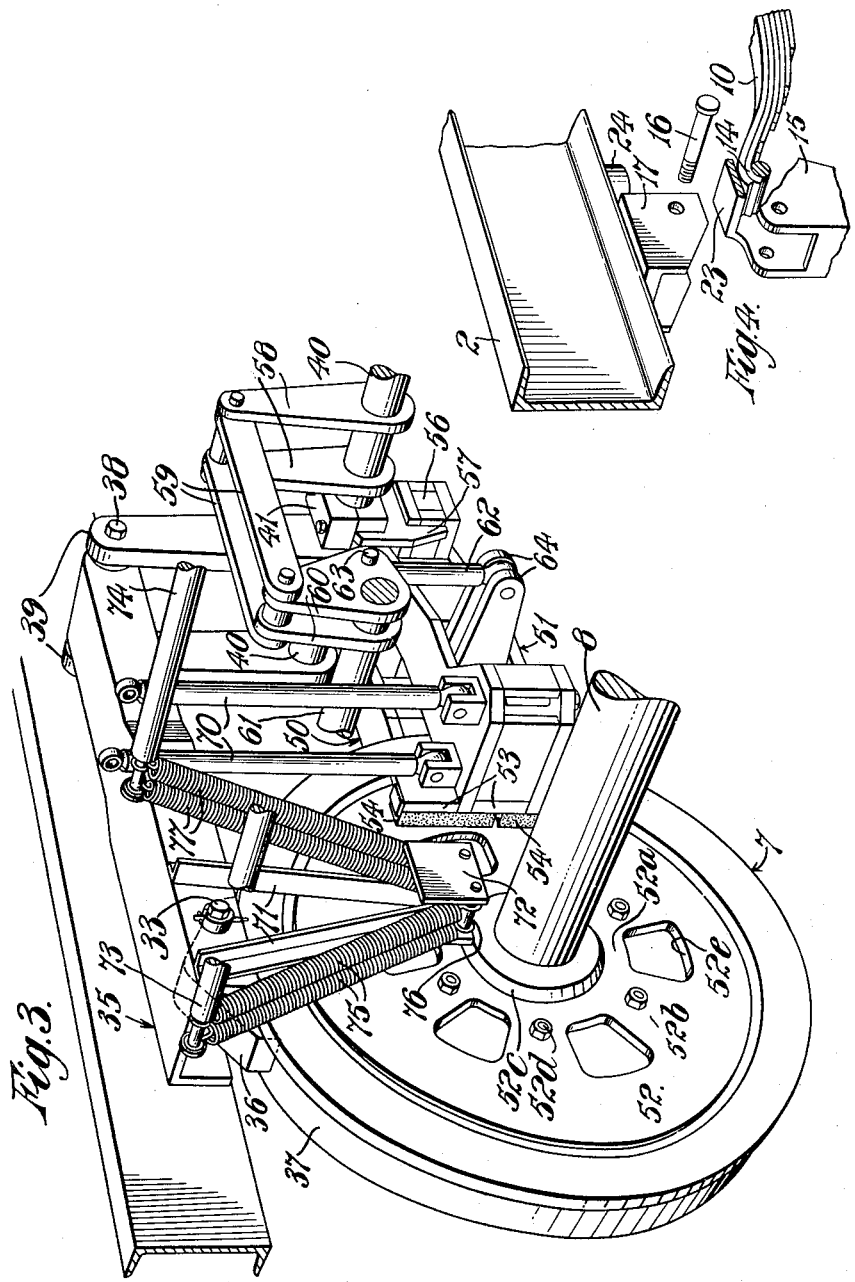

United States Patent Office 3,027,982
Patented Apr. 3, 1962

3,027,982
BRAKING SYSTEM FOR ROLLING STOCK
Henry James Butler, Sutton Coldfield, England, assignor to Dunlop Rubber Company Limited, London County, England, a British company
Filed Dec. 26, 1957, Ser. No. 705,234
Claims priority, application Great Britain Dec. 29, 1956
12 Claims. (Cl. 188—195)

This invention relates to a braking system for vehicles and more particularly relates to a braking system for rolling stock such as railway wagons.

The object of the present invention is to provide an improved braking system for such vehicles in which the braking may be increased by means responsive to the load carried by the vehicle.

According to the invention a braking system for a vehicle comprises means movable first to apply a brake and then to actuate means adapted to vary the braking effect obtained in accordance with the weight carried by the vehicle.

According to the invention also a braking system for a vehicle comprises a monitor brake and a main brake both associated with a wheel of said vehicle, originating means under the control of an operator for applying said monitor brake, means actuated by said monitor brake for applying said main brake and means responsive to the load carried by the vehicle and operable when the force exerted by said originating means exceeds a certain value for varying the braking effect of the main brake in accordance with variations in said load.

The vehicle wheel, to which the braking system is applied, is preferably supported by a semi-elliptic leaf spring one end of which is pivoted to the vehicle frame and the other end of which is slidingly supported in a bracket pivotally secured to said frame, the bracket normally being in such an angular position that a portion thereof abuts a stop on the vehicle frame so that the end of the spring is, to all intents and purposes, in sliding abutment with the frame. The lever to actuate the monitor brake may be applied by fluid-pressure or vacuum means, or it may be applied mechanically or by hand, and is pivotally mounted in the lower end of said bracket. The lever first pivots about the end which is pivotally connected to said bracket, to apply the monitor brake through a first pull-rod pivoted intermediate the ends of the lever and a second pull-rod pivoted in the lower end of the lever. Upon the monitor brake being applied, so that all clearances are taken up, the lever then pivots about its lower end and thus angularly moves the bracket, containing the free end of the spring, downwardly away from the vehicle frame. The weight of the frame, and any load thereon, is thus transmitted through the bracket to the associated end of the lever, and this, acting through the pull-rod, adjusts the braking load on the monitor brake in accordance with the weight of the frame and its load, and this, in turn, varies the braking effect of the main brake.

But a better understanding of the invention may be had from the following description of one embodiment thereof when this is read with reference to the accompanying drawings, of which:

FIGURE 1 is a perspective view of a braking system according to the invention as seen from the outside of the frame of the vehicle, FIGURE 2 is a view similar to FIGURE 1, of the main brake portion of the braking system showing some portions in section and other portions in exploded relation thereto, FIGURE 3 is a view similar to FIGURE 1, but taken from between the wheels of the vehicle, and FIGURE 4 is an exploded, part-sectional, view of a portion of FIGURE 1.

In the embodiment of the present invention shown in the drawings, the braking system, as adapted for use on a railway wagon, comprises a conventional vacuum cylinder 1 secured to the frame 2 of the wagon intermediate the wheels on one side thereof, and connected into a vacuum system in the known manner. A plunger 3 is vertically slidable in the cylinder and a plunger rod 4, projecting from the underside of said cylinder 1, is adapted to rotate a transverse shaft 5 through an arm 6 secured to the shaft 5 and having its free end pivoted to the plunger rod 4. Lever arms 6a secured to each end of the shaft 5 are each adapted to actuate the braking mechanism associated with the adjacent one of a diagonally-opposite pair of wheels 7, only one of which is shown in the drawings. In such a case the other diagonally-opposite pair of wheels would be unbraked.

As both braking mechanisms are substantially identical it is considered necessary to describe only one of these. It should be understood, however, that although a braking system of the present invention will normally be applied to diagonally-opposite wheels 7 of the vehicle, except as modified in the next-following paragraph hereunder, where the orientation of the brake requires any modification due to its application to transversely-opposite wheels of a vehicle (i.e., wheels at opposite ends of the same axle), the modified brake will be substantially a mirror image of that now under description. For instance, in a four-wheeled railway vehicle braking system applied to all four wheels of the vehicle, the brakes for the diagonally-opposite front nearside and rear offside wheels will be identical to each other, and those applied to the front offside and rear nearside wheels will similarly be identical to each other and will also be mirror images of those applied to the first-named two wheels. It will also be appreciated that the leaf springs of such a vehicle are normally pivoted at the ends thereof nearest to the buffers and slidably abut the frame at their other ends. For this reason the brake systems for the wheels of a rail vehicle will be located between the adjacent wheels on each side of the vehicle.

Whilst it is preferred to provide a separate braking system for each wheel of the vehicle, as aforesaid, it is within the scope of the invention, and indeed may be advantageous in some of the lighter types of rail vehicle, to secure the brake disc, later to be described, to the live axle connecting an opposite pair of wheels. This will not affect the invention except in regard to the proportions of certain of the operating rods and shafts, and such modifications will be obvious to those skilled in the present art.

The wheel 7 is secured adjacent one end of a live axle 8, the end of which is rotatable in bearings in an axle box 9 in known manner. A semi-elliptic leaf spring 10, extending longitudinally of the wagon and having a central portion bearing on said axle box 9, has the end towards the buffer end of the wagon formed into an eye 11 through which is passed a pin 12 secured in a shackle 13 bolted to the wagon frame. The other end 14 (FIGURE 4), i.e. the end adjacent the vacuum cylinder 1, is slidably located within, and supported by a box-like bell-crank member 15 which is pivoted at 16 to a bracket 17 extending downwardly from the wagon frame 2. The other end of the bell-crank member 15 (FIGURE 1) is pivotally secured to one end 19 of a link 20, the other end 21 of which is pivotally secured to one end of a pull-rod 22 later to be described. The upper surface of the short arm 23 (FIGURE 4) of the bell-crank member 15 normally abuts a stop 24 secured to the wagon frame 2 so that the end 14 of the spring 10 is normally solid with the wagon frame. However, on pivoting the said bell-crank member 15 about the bracket 17, as will be seen hereunder, this end 14 of the spring is moved angularly downwards and away from said stop 24.

The link 20 (FIGURE 1) which is pivoted at one end 19 to said bell-crank member 15 and is pivoted at its other end 21 to said pull-rod 22, is pivoted, intermediate said ends but closer to the end 19, to a pull-rod 25, the other end of which is pivoted as at 26 to the lever 6a secured to the end of the transverse shaft 5.

The end of the pull-rod 22 remote from the link 20 is pivoted in one arm of a bell-crank lever 27 pivotally connected between its ends to a bracket 28 secured to one side of the axle box 9. The other arm of the bell-crank lever 27 has pivoted thereto the lower end of a vertical pull-rod 28a, the upper end of which is pivoted to one end of a swinging beam lever 29, the opposite end of which is pivoted to a vertical link 30 pivoted between ears 31 secured to the opposite side of the axle box 9.

Intermediate the ends of the swinging beam lever 29 is pivoted a vertical link 32, the upper end of which is secured to a pivot pin 33 which is passed horizontally through holes formed in the limbs 34 of a floating beam 35 of substantially box-section. Between the vertical sides 34 of the floating beam 35, on the pivot pin 33, is pivoted a monitor-brake shoe 36 in such a position that its under-surface is normally located adjacent, and slightly clear of, the rail-engaging outer periphery of the rim 37 of the wheel 7 in a position normally lying at about 12 o'clock in relation to the wheel.

The other end of the floating beam 35, i.e. the end thereof nearest to the vacuum cylinder 1, is pivoted on a horizontal pivot pin 38 which extends between parallel vertical arms 39 secured to a horizontal shaft 40 which is rotatably held in bearing blocks 41 secured to a non-rotatable portion of the vehicle. The shaft 40 extends transversely of the vehicle adjacent the cylinder 1.

The floating beam 35, pivoted on the pin 38, is thus adapted to be moved angularly about the pin 38 and is also free to move backwards and forwards longitudinally of the vehicle by rocking the arms 39 and shaft 40 in the bearing blocks 41 as will be described hereunder.

The main brake of the system comprises two channel-sectioned pincer-like arms 50 and 51 (FIGURES 1, 2, 3) horizontally disposed, one on each side of the wheel 7, so that their free ends overlap the periphery of the wheel rim 37 and extend radially inwardly to a point adjacent the inner peripheries of a pair of annular discs 52 secured one at each side of the wheel 7 with their outer peripheries engaging within the inner periphery of the rim 37. The discs each comprises an annular disc portion 52 and an annular hub portion 52a. A series of spoke-like members 52b connect the outer and inner annular portions 52, 52a to provide means whereby each disc is supported at its inner periphery by the hub 52c of the wheel 7. The discs are secured to the wheels 7 as by bolts 52d. The spaces 52e between adjacent spokes 52b provide for a circulation of air through the interior of the wheel for cooling the discs 52.

Upon the inner surface of the free end of each arm 50, 51 (FIGURE 2) is secured a backing plate 53 which lies between the arm 50 or 51 and the disc 52, and to each plate, 53 is secured a friction pad 54 which lies adjacent the outer radial surface of the respective disc 52, substantially covering the radial depth thereof to the outer end of the spokes 52b and extending angularly over a small portion of its circumference. Each pad 54 is substantially rectangular on its inner and side edges, the outer edge being arcuate to conform to the outer periphery of the disc 52.

The other end of each pincer arm 50, 51 is bifurcated to form two horizontal ears 55 by which the arms 50, 51 are adapted to pivot in a horizontal plane about pins 55a passed vertically through a spacer block 56 located between the ears 55 and secured to a non-rotatable portion 57 of the vehicle below the shaft 40.

Secured to the shaft 40 (FIGURE 3) axially-inwardly of the vertical arms 39 is a pair of vertical parallelly-spaced arms 58 the upper ends of which are pivoted to one end of each of a pair of horizontal parallelly-spaced links 59, the other ends of which are pivoted to the apices of a pair of parallelly-spaced triangular plates 60 which are substantially isosceles in form. One of the base angles of each of these plates 60 is secured to a shaft 61 rotatable in bearings (not shown) secured to a non-rotatable portion of the vehicle so that the plates 60 are rotatable with the shaft 61 in a vertical plane longitudinally of the vehicle. In the other basal corner of the plates 60 the upper end of a rod 62 is pivoted on a pivot pin 63 passed through the plates. In effect, the plates 60 simulate a bell-crank lever rotatable about the fulcrum 61.

The lower end of the rod 63 is pivoted between a horizontally-disposed pair of transverse cam levers 64 (FIGURE 2) the inner ends of which are formed with symmetrical cam surfaces 65, 66 which comprise a substantially arcuate face 81 at the end of each arm, each cam surface 65, 66 having a semi-circular recess 82 formed horizontally thereacross. A block 83 is secured to the web 67 of the pincer arm 51 on the side adjacent the arms 64, and a pair of recesses 84 adapted to cooperate with the recesses 82 is formed thereacross. An eye-bolt 68, is pivoted on a pin 68a between the levers 64 adjacent the cam surfaces 65, 66, and is passed loosely through a hole 67a in the web 67 of the pincer arm 51 and is secured in the web 69 of the pincer arm 50. The arcuate surfaces 81 of the arms 64 lie close to the adjacent face of the block 83, and pins 85 are inserted between each of the co-operating recesses 82 and 84 so that upon vertical rotation of the levers 64 in either direction, the engagement of the cam surface 65 or 66 against the web 67 of the pincer arm 51 will react upon the eye-bolt 68 and cause the pincer arms 50 and 51 to be drawn together to press the friction pads 54 against both discs 52.

The free ends of the pincer arms 50 and 51 are suspended from the frame of the vehicle by rods 70 having pivotal connections at each end.

The monitor brake shoe 36 is normally located at 12 o'clock with respect to the wheel 7 and clear of the rim 37, and means are provided to retain it in this position when inoperative, and to return it to this position after operation of the brake in either direction of rotation of the wheel 7. As the operative connection between the monitor brake and main brake is by means of rigid rods and links, operable in either direction, it will be obvious that the return of the monitor brake shoe 36 to its neutral position will automatically release the main brake. If, however, a positive separation of the pincer arms 50, 51 is desired, this can readily be provided by placing a helical compression spring on the eye-bolt 68 in the space between the two arms 50 and 51.

To return the monitor brake shoe 36 to its normal inoperative position an inverted triangular frame 71 (FIGURE 3) is secured to the floating beam 35 with its base lying symmetrically on each side of the pivot pin 33 and its apex 72 normally lying at 12 o'clock with, and clear of, the live axle 8. Two horizontal widely-spaced rods 73, 74 are secured to the vehicle frame above the beam 35, symmetrically spaced on each side of the base of the frame 71. Two helical tension springs 75 are located under tension between the rod 73 and a rod 76 at the apex 72 of the frame 71, and two similar springs 77 are located under similar tension between the rod 74 and a further rod (not shown) similar to the rod 76 at the apex 72. Thus movement of the floating beam 35 in either longitudinal direction will lower the tension in the springs 75 or 77 in the direction of the movement and will increase the tension in the other springs, so that when the force moving the beam 35 is released the springs under the greatest tension will draw the beam back to its central position with the springs 75, 77 under equal tension. The preliminary tension in the springs 75 and 77 will also draw the monitor-brake shoe 36, and the associated end of the beam 35, away from the rim 37.

In describing the operation of the braking system the inter-operation of the monitor and main brakes will first be described.

The operator first moves a control to connect the upper portion of the vacuum cylinder 1 with a cource of subatmospheric pressure, and atmospheric pressure, acting upwardly on the lower side of the piston 3, causes said piston and piston rod 4 to move upwardly, rotating the lever arms 6 and 6a and the shaft 5 in a clockwise direction and thus pulling the rod 25 to the left as seen in FIGURE 1.

(For the sake of clarity it is, at the moment, assumed that the bell-crank member 15 is not pivoted to the frame of the vehicle and that the weight and load will thus have no effect thereon.)

The link 20 is pivoted about its upper pivot at 19 by the pull of the rod 25, and its lower end thus pulls the rod 22 to the left, pivoting the bell-crank 27 about its fulcrum and drawing the rod 28a downwards to swing the swinging arm 29 about its pivot on the link 30. The link 30 being secured to the bracket 31, the arm 29 cannot swing about its centre pivot to the pull of the rod 28a but pivots about the link 30 so that the link 32 is pulled downwards, lowering the adjacent end of the floating beam 35 and pressing the monitor-brake shoe 36 into frictional engagement with the rim 37 of the wheel 7. In whichever direction the wheel 7 is rotating, this frictional engagement will cause the monitor-brake shoe 36 to follow the rim 37, and the floating beam will be moved longitudinally in the same direction, i.e., the direction of movement of the vehicle, until its angular movement is stopped by resistance due to engagement of the main brake, when there will also be relative frictional movement between the rim 37 and the shoe 36 which, although it will obviously exert a slight braking effect upon the rim, plays only a very small part in the actual braking action.

The main brake is operated by the monitor brake shoe 36 and floating beam 35 in either direction of movement of the vehicle in the same manner and the further description is given on the assumption that the vehicle is moving to the left of FIGURE 1.

Thus, when the monitor-brake shoe 36 is drawn into engagement with the wheel rim 37, as described above, the frictional engagement causes the shoe 36 and beam 35 to be moved to the left with the counter-clockwise rotation of the wheel 7, and the vertical arms 39 and 58 are similarly rotated to the left, or counter-clockwise, with the shaft 40. This moves the links 59 to the left and rocks the triangular member 60 counter-clockwise on its shaft 61, pressing the rod 62 vertically downwards and tilting the cam levers 64 in the eye of the eye-bolt 68 (FIGURE 2) causing the lower cam surface 66 to press the lower pin 85 in the recesses 82, 84 against the block 83 secured to the web 67 of the pincer arm 51, to force the friction pad 54 thereon against the disc 52 on the adjacent side of the wheel, and reaction of the cam levers 64 and eye-bolt 68 drawing the friction pad 54 on the pincer arm 50 against the disc 52 on the other side of the wheel. The arms 50 and 51 act as pincers to grip the wheel discs 52 between the friction pads 54 with a force proportionate to the frictional engagement between the shoe 36 and the rim 37. Thus, the actual maximum braking effect of the main brake can be predetermined by varying the mechanical advantages to the link 20, bell crank lever 27 and swinging arm 29 by the choice of the relative location of the centre pivot in relation to the end pivots, in each case.

The operation of the main brake in the opposite direction of travel of the vehicle is exactly the same as described hereabove except that the levers, links and rods between the monitor-brake shoe 36 and the cam levers 64 all operate in the reverse direction so that the cam surface 65 and upper pin 85 are pressed against the block 83 secured to the web 67.

Adjustment of the monitor-brake shoe 36 to allow for wear and also to adjust the frictional engagement between the shoe and the rim 37 may be effected by an adjusting nut 80 (FIGURE 1) screwed on the lower end of the rod 28a which is screw-threaded and is passed loosely through a hole in a pivot pin 81 in the short arm of the bell-crank lever 27 prior to engagement of the nut 80. The spacing of the friction pads 54 from the radial sides of the disc may be adjusted by rotating the nut 86 on the threaded portion 87 of the eye-bolt 68.

A difficulty experienced in the braking of rail vehicle wheels is that of relating the braking force to the adhesion of the wheels to the rails, as a brake which will provide a maximum torque absorption without causing the wheels of a heavy-laden vehicle to skid or lock is far too fierce on an unladen vehicle, and although this difficulty could to some extent be obviated by adjustment of the adjusting nut 80, such adjustment would be of a nature requiring some amount of skill and so would be most inconvenient in the normal running of railway rolling stock. However, it is most essential to eliminate the locking or skidding of the wheels as this is likely to tear away the metal of both the rail and the wheel rim and to cause flat surfaces to develop on the rim, thereby producing excessive vibration and axle bearing wear.

According to the present invention, therefore, means are provided whereby the braking pressure applied by the main brake is correlated with the weight supported by the spring 10 associated with the respective wheels. This is of particular importance where the train comprises vehicles carrying unequal loads, as is usually the case, since without said means the driver of the train might apply the brake with a braking force which, although it would provide maximum deceleration for an empty vehicle, would have little effect on a heavily-laden one. Thus in the system described below the driver can fully apply the brakes and the braking of each individual vehicle will be a function of the load carried by the vehicle.

Thus (FIGURES 1 and 4) when the shaft 5 is first rotated to apply the monitor-brake shoe 36, the link 20 is rotated about its upper pivot in the end 19 and the shoe 36 is applied as stated hereabove. As originally described hereabove, however, the box-like bell-crank member 15 is pivoted in the bracket 17 secured to the vehicle frame and has an arm 23 (FIGURE 4) located between the free end 14 of the spring 10 and the boss 24 on the frame. The arm 23 thus supports the weight carried by the end 14 of the spring 10, which weight will vary according to the load carried by the vehicle.

When the link 20 has pivoted about the end 19 to bring the shoe 36 into engagement with the rim 37 its further appreciable movement is prevented by this engagement, which will be effected with only a small movement of the piston 3 which, as previously mentioned, is still constrained to continue its movement to the top of the cylinder 1. Thus, despite the engagement of the shoe 36 with the rim 37, the rod 25 is still exerting a substantial pull on the link 20. Due to the engagement of the shoe 36 the linkage 32, 29, 28a, 27 and 22 is substantially unyielding and the pivot at 21 thus becomes a fixed point against which the rod 25 is pulling. The box-like bell-crank member 15 is pivoted to the bracket 17 and its depending portion from the pivot 16 to its pivotal connection with the upper end 19 of the link 20 is of a length such that the pull of the rod 25 against the now-fixed pivot 21 causes link 20 to pivot about the pivot 21 and the member 15 to pivot about the pivot 16 so that the arm 23 moves away from the boss 24, presses the spring end 14 downwards and, as it were, "jacks" the vehicle frame and load upwards so that they are supported by the arm 23. The greater the load applied to the arm 23, the greater is the resistance of the member 15 against pivoting on the pin 16 and the stronger the resistance of the pivot at the end 19 to angular movement. Proportionally to this resistance of the end 19, so does the rod 25 exert a stronger or lesser pull on the pivot 21 and rod 22. Thus the shoe 36 is forced against the rim 37 with a greater or lesser pressure depending upon the weight carried by the arm 23. The angular movement of the shoe 36 with the rim of the wheel is restricted only by the friction therebetween and that between the friction pads 54 and the discs 52, so that the greater the value of the friction between the shoe 36 and the rim 37 the greater will be the angular movement of the shoe 36 and the greater the frictional engagement of the friction pads 54 with the discs 52. As the value of the friction between the shoe 36 and the rim 37 is dependent upon the weight supported by the arm 23 (disregarding variations caused by grease, water or the like on the friction surfaces), it follows that the degree of braking of the friction pads 54 on the discs 52 is proportionate to that weight, and the application of the brakes is thus made at a value that is correlated with the weight conditions existing at any given time without necessity for the adjustment of the nut 80 except for the purpose of taking up wear.

In order to provide the maximum frictional effect of the brake shoe 36 upon the wheel rim 37 without undue wear of the rim portion, the shoe is preferably made from cast iron of the grade normally used for conventional rail vehicle brake shoes. The shoe of the present invention takes only a very minor proportion of the friction of braking the vehicle—only as much, in fact, as will cause the shoe to move angularly with the rotation of the wheel—so that the wear thereon is of a particularly low order, and although the shoes will require periodic replacement, this replacement will be necessary at considerably longer intervals than in conventional brakes. As only one shoe is involved with each wheel, the number of shoes to be replaced is also halved in comparison with the conventional railway vehicle shoe brake.

Whilst the invention has been described in relation to the braking of a railway freight vehicle of the known type it is equally adaptable to any type of railway rolling stock, including motor, steam or electric locomotives. It can also be used on that class of vehicles to which both rail and road wheels are fitted, i.e. vehicles having a rubber-tyred road wheel and a metal-tyred rail wheel arranged side-by-side at each end of the live axle.

Similarly, although the brake has been described as being vacuum-operated it can readily be adapted to be operated by fluid-pressure, by mechanically-operated means or by electricity in any of the known methods of applying the brakes of rail vehicles, and, when the brake is substituted for brakes already fitted to the vehicle, without any extensive modification of the existing means.

It will be clear from the above description that the braking system is equally applicable to those systems in which the braking pressure initially applied is under the control of the person operating the brakes, normally the engine driver, and also to those systems wherein the operator has no control of intermediate pressures and wherein the brakes are applied to their maximum extent on each operation of the brake-applying valve or like means. In the first instance, the "jacking" control will take over from the operator, to vary the braking pressure to the prevailing conditions, in the event of too fierce an application of the brakes by the operator. In the second instance it will adjust the braking pressure actually applied to the wheels in accordance with prevailing conditions despite the fact that the brakes are theoretically fully-applied by the actuating means.

Having now described my invention—what I claim is:

1. A braking system for a vehicle comprising a monitor brake, a main brake, both of said brakes acting on surfaces rotating with a wheel of the vehicle, operator controlled means to apply said monitor brake, a linkage for transmitting force from said operator controlled means to said brakes, said linkage comprising a lever supporting at least a part of the load of the vehicle and displaceable against said load to limit the force transmitted to said monitor brake.

2. A braking system according to claim 1 wherein said monitor brake comprises a brake shoe adapted to be brought into frictional engagement with the peripheral rim of said wheel, said shoe being mounted to be moved longitudinally of said vehicle in the direction of movement thereof by said frictional engagement, and said main brake comprises a pad of friction material movably mounted frictionally to engage the radial side of a disc associated with said wheel, said monitor brake and said main brake being operatively connected by actuating means whereby longitudinal movement of said monitor brake shoe forces said friction pad into frictional engagement with said radial side of said disc.

3. A braking system according to claim 2 wherein said main brake comprises two pincer arms pivoted to a non-rotatable portion of said vehicle and movable in a horizontal plane, the free ends of said pincer arms extending one on each side of said disc and enclosing between them a portion of the periphery thereof, a pad of friction material secured to each said pincer arm adjacent the free end thereof and on the side thereof adjacent said disc and means associated with said actuating means whereby said pincer arms are squeezed together to bring said friction pads into frictional engagement with opposite sides of said disc upon movement of said monitor brake shoe in either longitudinal direction relative to said vehicle.

4. A braking system according to claim 3 wherein the means to squeeze said pincer arms together in either direction of movement of said monitor brake shoe comprises a cam member pivoted for movement in a vertical plane and comprising opposed cam surfaces adapted selectively to be brought into engagement with one of said pincer arms in either direction of pivotal movement of said cam member in said vertical plane from a central position thereof, said cam member being pivoted adjacent its cam surfaces in the end of a member passed loosely through said one of said pincer arms and being secured in the other of said pincer arms intermediate the ends thereof.

5. A braking system according to claim 3 wherein said disc comprises two annular plates secured one on each side of said wheel.

6. A braking system for a vehicle having a wheel supported undercarriage and a spring suspension between said undercarriage and the frame of said vehicle which comprises a monitor brake and a main brake to brake a wheel of said undercarriage, originating means controlled by an operator for applying said monitor brake, means actuated by said monitor brake to apply said main brake with a force governed by the effective force from said monitor brake, and means supporting at least a part of the load of the vehicle and displaceable against said load to limit the force applied to said brakes in accordance with the weight of said load.

7. A braking system for a vehicle having a wheel supported undercarriage and a spring suspension between said undercarriage and the frame of said vehicle which comprises a monitor brake and a main brake to brake a wheel of said undercarriage, originating means controlled by an operator for applying said monitor brake, means actuated by said monitor brake to apply said main brake, said means for applying said monitor brake comprising a linkage between the originating means and the monitor brake, said linkage comprising a pivot supported on said spring suspension to receive the thrust thereof under, and proportional to, the load thereon to limit the force of application of said monitor brake.

8. The braking system of claim 1 in which said linkage comprises a first lever receiving force from said originating means and transmitting said force to said monitor brake and having a floating pivot pin and a second lever carrying said pivot pin and having a fixed fulcrum and a fulcrum supported by said spring suspension to receive a load of said spring suspension whereby said second lever may be tilted as a result of the force from said originating means and the load of said spring to shift said floating pivot and proportion the force from said originating means applied to said monitor brake.

9. The braking system of claim 8 in which said originating means comprises a vacuum cylinder having a piston slidable therein and which comprises a depending bell-crank lever having a fixed pivot to support it from the frame of the vehicle and having a horizontal arm extending substantially at right angles thereto and forming a sliding abutment for a loaded part of said spring suspension, said bell-crank lever also having a linkage pin on a depending arm which swings under the load applied from said suspension, a lever pivoted to said linkage pin of said bell-crank lever, means for transmitting force from said vacuum cylinder to said depending lever comprising a pull-rod pivotally connected to said depending lever, a second pull-rod pivoted to said depending lever at a different distance from the connection of said first pull-rod and means for connecting said second pull-rod to said monitor brake to apply a braking force to said monitor brake resulting from the forces of said spring load and said vacuum cylinder.

10. The braking system of claim 9 in which said spring suspension comprises a leaf spring one end of which is supported by said abutment of said bell-crank lever.

11. The braking system of claim 9 having a shiftable support for said monitor brake to enable said monitor brake to move a limited distance with said wheel upon application of said monitor brake and a linkage comprising cam means for applying said main brake.

12. The braking system of claim 11 in which said monitor brake comprises a brake pad to engage the tire of a wheel and said main brake is a disc brake having pads to engage opposite faces of a disc rotating in fixed relation to said wheel.

References Cited in the file of this patent

UNITED STATES PATENTS

| | | |
|---|---|---|
| 710,876 | Mallinckrodt | Oct. 7, 1902 |
| 1,002,312 | Ransom | Sept. 5, 1911 |
| 1,133,667 | Ransom | Mar. 30, 1915 |
| 2,250,725 | Ransom | July 29, 1941 |
| 2,751,046 | Tack | June 19, 1956 |

FOREIGN PATENTS

| | | |
|---|---|---|
| 167,039 | Australia | Feb. 20, 1956 |